United States Patent [19]

d'Oosterlynck

[11] Patent Number: 5,672,371

[45] Date of Patent: Sep. 30, 1997

[54] METHOD FOR SEPARATING THE TOXIC RESINOUS FRACTION FROM PREPARED WHOLE JOJOBA SEEDS OR JOJOBA SEED PRESS-CAKE

[76] Inventor: André d'Oosterlynck, Museumlaan 17, 9831 Sint-Martens-Latem, Belgium

[21] Appl. No.: 544,447

[22] Filed: Nov. 17, 1995

[30] Foreign Application Priority Data

Nov. 17, 1994 [BE] Belgium ................. 09401036

[51] Int. Cl.$^6$ ..................... A23L 1/211
[52] U.S. Cl. ............. 426/430; 426/478; 426/486; 554/12; 554/14
[58] Field of Search ............. 426/489, 486, 426/478, 430; 554/8, 9, 12, 14

[56] References Cited

U.S. PATENT DOCUMENTS

| | | | |
|---|---|---|---|
| 4,148,928 | 4/1979 | Sodini | 426/430 |
| 4,387,110 | 6/1983 | Emmi | 426/430 |
| 4,548,755 | 10/1985 | Stahl | 260/412.8 |
| 5,290,959 | 3/1994 | Rice | 554/11 |
| 5,516,923 | 5/1996 | Hebert | 554/12 |
| 5,525,746 | 6/1996 | Franke | 554/12 |

FOREIGN PATENT DOCUMENTS

| | | |
|---|---|---|
| 781888 | 4/1972 | Belgium . |
| WO94/25035 | 11/1994 | WIPO . |

OTHER PUBLICATIONS

"Detoxified and Debittered Jojoba Meal: Biological Evaluation and Physical–Chemical Characterization", Medina et al., *Cereal Chemistry*, Sep./Oct. 1990, vol. 67, No. 5, pp. 476–479.

"Comparison of Alternative Solvents for Oils Extraction", Johnson et al., *JAOCS*, Feb. 1983, vol. 60, No. 2, pp. 229–242.

*Primary Examiner*—Carolyn Paden
*Attorney, Agent, or Firm*—Bacon & Thomas

[57] ABSTRACT

The resinous fraction comprising toxic p-coumaric acid derivatives is extracted from jojoba press-cake by means of an apolar mixture of solvents which mixture is a selective eluter for said p-coumaric acid derivatives. Particularly the extraction is performed with a mixture of acetone and hexane comprising up to 70 vol. % acetone or with a mixture of methyl ethyl ketone and hexane comprising up to 80 vol. % methyl ethyl ketone.

7 Claims, No Drawings

METHOD FOR SEPARATING THE TOXIC RESINOUS FRACTION FROM PREPARED WHOLE JOJOBA SEEDS OR JOJOBA SEED PRESS-CAKE

BACKGROUND OF THE INVENTION

This study relates to a method for isolating the physiologically active brown resinous substances, apart from a sterol fraction of minor importance, from the prepared whole jojoba seed or from the remaining jojoba press-cake, eventually after the removal of the residual oil by solvent extraction

1. Field of the Invention

Jojoba (*Simmondsia chinensis* (Link) C. K. Schneider) is a plant which grows in semi-arid areas.

The original habitat of this evergreen plant is situated in the Sonora desert namely in the triangle from Los Angeles Calif., Tucson Ariz. to the southern tip of Baja California, Mexico.

Jojoba seeds contain approximately 50 weight % liquid wax, with an average composition of C44 erucyl-erucate monoester, called jojoba oil.

Unless otherwise specified, all percents mentioned hereafter are weight %.

This jojoba oil is an unsaturated mono-ester with a high economic value, which is used in the cosmetic and pharmaceutical industries.

The press-cake which remains after pressing the prepared seeds, still contains, among other compounds, an average of 13% jojoba oil, which so far constituted the residual value of the press-cake. This oil is removed by means of hydrocarbon extraction (usually Hexane).

The deoiled press-cake could be a suitable animal feed if it were not for the presence of a number of soluble resinous substances which make it unedible. These resinous substances comprise polyphenolic polymers, pro-anthocyanidin like derivatives, simmondsins and coumaric acid derivatives.

These substances make up an overall 1-2,5% of the oil-free, water-free press-cake. So far the deoiled press-cake has not been used by industry. Therefore several thousand tonnes of plant product, 50% of the annual harvest, is lost each year through dumping.

By removing one or more substances the use as an animal feedstock for specific applications becomes possible.

The methods which have hitherto been described to prepare jojoba meal as a feedstock can be divided into two groups:

Group 1: methods which attempt to remove the simmondsins from the press-cake by a process of fermentation. These methods require major investments in high-volume reaction vessels, dehydration and drying installations. The detoxification(?) time is ten days or more. The simmondsins are more or less destroyed by this process, which also ignores the presence of the soluble brown resins.

These methods still do not result in end products which are sufficiently edible.

Group 2: these methods use polar elution solvents to extract the simmondsins. These methods also make some mention of certain gum-like by-products which are difficult to separate from the simmondsins.

These are implemented on an experimental scale to extract simmondsins for scientific research. The method uses acetone as an eluent for the simmondsins and is time-consuming and therefore impractical. This method neither dissolves nor separates the resinous substances.

Neither of these two methods is being implemented on an industrial scale so far.

2. Brief Description of the Present Technology

The jojoba seeds are prepared for processing and±70 to 80% of the oil present in the seeds is extracted by pressing. These end products are called cold pressed jojoba oil and jojoba press-cake.

The residual value of the press-cake is determined exclusively on the basis of the remaining oil.

After solvent extraction of the residual oil, for which Hexane is generally used, the value of the deoiled press-cake (jojoba meal) is zero or even negative, because dumping costs money.

The oil eluted through solvent extraction is isolated as a distillation residue from the Hexane eluent as "solvent-extracted" quality.

Until now this product has been considered to be inferior in quality to the oil extracted by pressing.

3. Aim

An investigation was carried out to find methods and specific solvents to extract the various targeted components from the press-cake.

SUMMARY OF THE INVENTION

4. Description of the New Findings

According to the new method the toxic fraction is removed from the whole jojoba seeds or the jojoba seed press-cake by extraction by means of an apolar mixture of solvents which is a selective eluter for the p-coumaric acid derivatives present in the jojoba seed materials.

The physiologically active resins are extracted by means of a mixture of acetone and an aliphatic solvent such as hexane, which is definitely different from the abovementioned use of acetone to isolate simmondsins, or by means of a mixture of methyl ethyl ketone and an aliphatic solvent such as hexane.

The principal condition in the use of mixtures of acetone-hexane is to proportionate the quantity of acetone to such an extend that the apolar character of the mixture is predominant. Doing so, Simmondsin and derivatives are practically not eluted. Less than 5% of the total simmondsins and simmondsin-ferulates present in the oilfree cake are eluted.

The extractions can be performed either on the oil free press-cake or on the press-cake containing residual oil.

As a variant the residual oil, the sterol fraction and the brown soluble resins can be leached out of the residual oil containing cake in one single operation, using either an acetone-aliphatic solvent or a methyl ethyl ketone-aliphatic solvent mixture.

Finally, each of the operations described above results in a different cake quality. In contrast to the current fate of cake, namely dumping (throwing away+the cost of doing so), this cake can be used effectively as an animal feedstock.

The extractions according to the invention are distinct from the extraction of the residual oil is by means of the well-known "Hexane" solvent extraction method. However, by optimizing the conditions and improving the construction of the extractor, a sterol like fraction can also be extracted.

5. Equipment Used and Method

A modified soxhlet extractor is used, fitted with a accurately adjustable valve in the eluent return tube, which must make it possible to maintain the eluent level in the extraction or percolation area at a specific level during the operation The percolating area is fitted with a filtering case, which is in turn filled with jojobacake, either deoiled or not, containing from 0.5% to 15% water. About±2 liters (1.2 kg) of cake can be treated. A distillation flask with a capacity of 4 liters is set up under the soxhlet percolator, and filled with 2.5 to 3 liters of the extraction solvent. A condensor is fitted on top of the extractor, and the distillation flask is then brought to the boil. The boiling solvent condenses in the top condensor and runs back hot onto the bed of jojoba press-cake to be percolated.

In this way the space where the cake is located is filled with the solvent-condensate at the beginning of the extraction process. Once the body is filled with condensate, the level of eluent is adjusted to a predetermined level using the valve in the returntube. The intensity of the extraction bypercolation is at its best when the eluent is at the highest possible temperature, mainly due to the reduction in the viscosity of the eluent. For a bed of press-cake which is about 30 cm high, and depending on the fineness of the grain (from 1 to 0.01 mm), the leaching process will be more than 95% complete after:

30 to 45 minutes for the oil removal from the whole prepared seeds or for the residual oil removal from the press-cake, 90 to 120 minutes for the soluble resins.

6. Press-Cake Specification

Since the value of the press-cake has hitherto been determined exclusively on the basis of the residual oil, and since the oil obtained by pressing is sold for a higher price than solvent extracted oil, it is logical to press "as hard as possible" to achieve the highest possible yield of oil by pressing, . . . wrong!

This method makes the press-cake so hot in the press that the sugars which are present in the press-cake—comprising 40 to 50% of the weight of the press-cake—melt, encapsulating the residual oil, resins and the simmondsins and making them partly useless.

These products will now be valued, due to the new findings under the heading: "description of the new findings", under Section 4

The minimum requirement which must be fulfilled during the production of the press-cake as a raw material for further applications is namely: the maximum temperature of the press-cake, measured at the outlet of the press using a reliable temperature measurement system, must be lower than 85° Centigrades (185° F.), knowing that the melting temperature of xylose is 90° Centigrades (194° F.). The other sugars present in the cake, melt between 100° and 125° Centigrades (212°–257° F.). The press-cake with a totally melted sugar inventory and the oil turned brown, contains 10 tot 14.5% residual oil on the basis of 0% water content in the cake.

Purely as an indication, a press-cake produced at temperatures lower than 90° Centigrades (194° F.) contains up to 15% yellowish residual oil, calculated on the basis of 0% water in the press-cake.

If the pressing temperature is limited, the percentage of oil residues in the press-cake calculated at 0% water will probably rise up to 16 or 17%. In addition, after isolation by solvent extraction, this oil has been found to be at least of the same quality as the oil obtained by pressing.

In summary we can define the advantages of these findings compared with the traditional method as follows:

Less electrical power is used in the pressing process.

The wear and tear on the thread of the pressing screw and other moving parts is reduced (due to the lower power required when pressing).

The soluble resins becomes technically extractable.

After specific extraction(s), the press-cake gains added value as an animal feed or animal feed additive.

The press-cake becomes a valuable raw material, since the soluble resins and sterol fraction are a new source of products.

Finally the level of investment in this design is low, since the solvent extractor which is used already can be used without major modifications.

In order to better explain the characteristics of the invention, the following preferred embodiment is described as example only without being limitative.

DETAILED DESCRIPTION OF THE PREFERRED EMBODIMENTS

The Apparatus

For all the operations as described below, a Soxhlet type extractor was used. The extractor was converted for the purpose of this study and its normal function was modified.

Explanation: the normal function of a soxhlet extractor is based on the cyclical filling and emptying of the extraction space with a solvent (=eluent), which vaporises in the distillation flask, condenses in the condensor and then finds its way to the extraction space. This means that the solvent is always fresh. The extraction space contains the product to be extracted, which can be dissolved by the condensate. The extraction space is connected with the distillation flask by means of an outlet siphon.

This piece of apparatus operates in a cyclical way, i.e. the extraction space is filled with the solvent by means of vaporisation (distillation) followed by condensation of the solvent.

Once the extraction space is filled-up with condensate, the siphon comes into action due to the law of communicating vessels, and the condensate, together with the substances dissolved in it, runs back into the distillation flask. The siphon working stops when the extraction space is empty.

The extraction space is then filled with fresh condensate again.

This filling, emptying, filling etc. takes place in a cyclical pattern.

It was found that it was possible to improve the efficiency or duration of the extraction by using an adjustment tap in the outlet siphon to set the level of eluent to a specific height during the extraction process, once the extractor space has been filled and the mass to be extracted has been covered by the solvent fluid. This extraction process runs continuously, it is efficient and provides better information for subsequent use on an industrial scale.

The Press-Cake

All press-cake qualities were investigated in detail.

Three groups of press-cake were brought in, namely:

melted press-cake, produced at temperatures of 120° Centigrade (248° F.) or more press-cake prepared at lower temperatures, probably at around 90° C. (no melted sugars were found)

press-cake prepared at approx. 60° Centigrade (140° F.), as the result of an integral solvent extraction procedure.

For each of these qualities, their effect on the speed of extraction, the efficiency (completeness) and the quality of the substances extracted were considered in accordance with the grain size (MESH) of the press-cake. The grain size is defined as coarse (1 to 0.1 mm), fine (0.1 mm to minimal)

or bulk (both coarse and fine, not separated). The coarse fraction was separated using a 60 MESH sieve.

The Extraction

1. According to a first form of embodiment, the oil residues were first extracted from the jojoba press-cake by means of a known method.

Two liters (±1.2 kg) of press-cake were weighed out into the extraction case and placed in the extraction space of the soxhlet. The distillation flask was filled with 2.5 to 3 liters hexane or pentane, the condenser was mounted and the extraction process was started.

During the extraction process the following was noted, as the extraction time proceeds:

the colour of the eluent changed (reported from experience)

the residual oil in the eluent flowing back into the distillation flask, monitored by sampling, evaporating the solvent and finished by gravimetric determination the extraction time was recorded for every "useful" piece of information (experience).

The extraction process was stopped after:

a predetermined time (programmatic when the eluent became colourless when the eluent flowing back clearly contained a minimal amount of oil (gravimetric).

The eluent was separated from the extracted oil by distillation and made free of residual solvent by applying vacuum.

The percentage of oil extracted was determined by weighing, in accordance with the press-cake quality, the moisture concentration in the press-cake and the extraction time. Pentane and Hexane were tested as solvents.

Hexane gave similar elution and a higher percentage of oil extraction than pentane. Subsequently only hexane was used.

The percentage of moisture in the press-cake: when Hexane was used as a solvent, the extraction time was at the minimum with 4 to 6% moisture in the press-cake.

Grain size (MESH) of the ground press-cake: the fine fraction (0.1 mm and less) yields more sterols and fatty materials in the extracted oil than the coarse fraction. The result of this was that when the extraction time was lengthened, more lipids (oil+sterol) were extracted from the fine fraction of press-cake.

Oil quality: the higher the temperature of the press-cake (during the oil was being obtained by pressing), the more the residual oil in the press-cake was coloured badly and the longer the extraction took afterwards. In the press-cake which was produced at temperatures up to 90° C. and more, we begin to find melted sugars in the cake. The additional extraction time required to achieve the same optimum oil extraction varies from about 30 minutes under ideal conditions to as much as three hours. The oil which is extracted from "melted" press cake is brown. On the other hand, if lower pressing temperatures are reached, the quality of the residual oil obtained after solvent extraction should not be lower than the quality of the oil obtained by pressing, on the contrary.

In a second step, the brown resins were extracted according to the invention using specific solvent mixtures. Brown resinous material were isolated which comprises up to 2% of the dry oil-free press-cake, depending on the different genotypes.

The resinous material was extracted from the oil free cake by means of a mixture of acetone and an another aliphatic solvent such as hexane, heptane, octane or low boiling petroleum ether, in a proportion of up to 70vol. % acetone, preferably up to 41 vol. % acetone.

2. In a variant of the above described form of embodiment the extraction of the second step was performed by means of a mixture of methyl ethyl ketone and another aliphatic solvent such as hexane, pentane, octane or low boiling petroleum ether, the mixture comprised up to 80 vol. % and preferably up to 50 vol. % methyl ethyl ketone.

3. In a third form of embodiment, the first form of embodiment was repeated but without the first step. This means that the remaining oil, soluble resins, the sterol and fatty material fraction were extracted from oil containing jojoba press-cake in one single step.

4. In a fourth form of embodiment the second form of embodiment was repeated but also without the first step.

5. In still other forms of embodiment the single step, extraction according to the third and fourth forms of embodiment are not performed on a press-cake but directly on the whole seeds.

In all forms of embodiment, chemical analysis of the brown resinous fraction using "Reversed Phase High Performance Liquid Chromatography (RP.HPLC)" and a database, based on retention times and the UV-Vis spectra of some 350 different polyphenolic and flavonoid substances, showed that this resinous fraction consists mainly of, approximately:

a group of poly-phenolic polymers, ex brown seed skin: 50% pro-anthocyanidin like derivates: 20%

Simmondsin, Simmondsin homologes and Simmondsinferulates: 20% a group of relatively apolar components, which were identified using the data base reference system mentioned above as para coumaric acid derivatives: 10%

The relatively apolar p.coumaric acid derivatives were also shown by RP.HPLC to be present in extracts from press-cake and integral seeds, but in much lower concentrations than in the resinous fraction. Hence, they were shown to be present in an enriched form in the resinous fraction described here.

In addition a series of comparative toxicological experiments were carried out, in which various extracts were tested originating from various parts of the jojoba seed, such as the seed-skin, the extractable resin and the central white part of the seed. From these tests it was possible to deduce that the toxicity of the jojoba seed tissue is associated with the group of relatively apolar p-coumaric acid derivatives in the resinous fraction. These rests are described in "Phytochemical Analysis and Toxicological Study of Jojoba Seed, Tissues and extracted Products"—Ghent State University.

In view of the detection and the chemical characterisation of the toxic fraction(s) present in Jojoba seeds(*Simmondsia chinensis*), the following seed tissues and seed derived products were studied, both phytochemically and toxicologically:

Isolated outer brown coloured seed-skin.

Inner yellowish coloured de-oiled seed tissue.

Deoiled jojoba press-cake.

Ground and deoiled seed material from whole jojoba seeds.

Resin fraction: obtained by Hexane/Acetone extraction of deoiled cake.

Quantitative Methanol/Ethanol (1/1 vol/vol) extractions were performed on the above mentioned jojoba seed products.

Subsequently, analytical R.P. HPLC separations were carried out with a 5% HCOOH in H2O/ 5% CH3CN in MeOH gradient. (Precolumn: length 30 mm. I.D.: 4 mm (Hibar, Merck), packed with irregular LiChrosorb RP.18/2 7 μm particles.Analytical column length: 250 mm. I.D.: 4 mm (Hibar,Merck),packed with spherical LiChrospher 100 CH-18/2 5 μm particles.

The chemical nature of the separated compounds was investigated with a date bank containing information on the tr and UV-VIS spectra of about 350 authentic (poly)phenolic references. In addition, the extracts were also examined for their toxicity with the Brine Shrimp Lethality Bioassay ( McLaughlin-1991).

The brine shrimp experiments revealed that the resin preparation was by far the most toxic fraction, followed by the seed skin and the press-cake extract. The corresponding RP.HPLC separation profiles showed that the toxicity of the above mentioned extracts is clearly connected with the presence of a serie of non-polar compounds that were all, after being comparised with the reference library system, recognised as coumaric acid derivatives.

Taking into account the relatively high tr's of these jojoba principles and the high similarity of the spectrum with p-coumaric acid, it can be assumed that non-polar esterified p-coumaric acid derivatives are involved in the jojoba seed toxicity. Furthermore, with our analytical RP.HPLC system it was possible to detect this toxic fraction in all of the above mentioned preparations (albeit in varying concentrations), except for the fraction derived from the inner part of the jojoba seeds, showing no toxicity at all with brine shrimp.

For the sake of completness, it must also be mentioned that a purified simmondsin preparation, containing all of the jojoba simmondsin and derivatives showed no toxicity with the brine shrimp experiment.

In conclusion, these results demontrate that a resinous fraction consisting of relatively non-polar coumaric acid derivatives (probably different esters), is involved in jojoba seed toxicity. The toxic resin in not present in the white-yellowish inner part of the seeds, but is localized at the exterior (skin) part.

Acetone-hexane and methyl ethyl ketone-hexane mixtures do not elute Simmondsin nor Simmondsin ferulate. Adjusting the acetone or methyl ethyl ketone concentration in hexane, prevents elution of Simmondsin and derivatives.

The invention will be further illustrated by means of the following examples:

EXAMPLE 1 extraction of Resins from oil containing press-cake.

The remaining oil, the soluble resins, the sterol and fatty material fraction were extracted from the press-cake containing oil in one single operation.

Two liters ( approx. 1 kg) of oil containing press-cake were weighed into the extraction case and placed in the extraction space of the soxhlet. The distillation flask was filled with 3 liters of acetone—hexane up to a 40/60 proportion, the condenser was mounted and the extraction process was started (heater on).

Checking the extraction time:

The eluent toke on a red-brown colour, and after 40 to 50 minutes of extraction the eluent returned to the destillation flask almost colourless.

By sampling the eluent as it flows back towards the distillation flask, the amount of solids dissolved in it could be determined by boiling off the eluent. When the residue in the eluent amounted to approx. 0.2 g per liter, the extraction process is stopped. The eluent in the distillation flask could be slightly cloudy, and if so after cooling there was a minute flaky precipitate at the bottom. The supernatant was a clear and wine red fluid. The supernatant was decanted off and the precipitate was recovered on a filter. This turns out to consist of minute amounts (max. 0.1%) of simmondsin derivatives. The solvent was recovered from the supernatant by distillation. At a temperature of 80° to 90° Centigrades (176°–194° F.) the residual oil, the sterol and fatty material fraction and the resins were made solvent free under vacuum and recovered. On storage, the sterol fraction and most of the fatty material precipitated from the oil.

EXAMPLE 2

The example 1 was replaced but the mixture acetone-hexane was repeated by a mixture of methyl ethyl ketone-hexane in a 50/50 volume proportion.

EXAMPLE 3 extraction of Resins from oil free jojoba press-cake.

The soluble resins, the sterol and fatty material fraction were extracted from the oil free press-cake in one single operation.

Two liters ( approx. 1 kg) of oil free press-cake were weighed out into the extraction case and placed in the extraction space of the soxhlet. The distillation flask was filled with 3 liters of acetone-hexane mixture in a 41% / 59% vol /vol proportion. The condenser was fitted and the extraction process was started.

The extraction time was checked in the same manner as, in example 1.

EXAMPLE 4

The example 3 was repeated, but the acetone-hexane mixture was replaced by a methyl ethyl ketone-hexane mixture in a 50/50 vol. proportion.

Results for example 1 to 4:

Solvent: acetone-hexane and methyl ethyl ketone-hexane are suitable mixtures for extracting the sterol fraction, the fatty material and the soluble resins.

Extraction time: for a bed of press-cake 30 cm high, an average extraction time of 120 minutes is sufficient to leach out the sterol fraction, the fatty material and the soluble resins Percentage of moisture in the press-cake: best between 5.0 and 6.5%.

Grain size (MESH) of the ground press-cake: 0.5 mm and less. More than 50% "pass" 60 MESH sieve size.

The press-cake must be produced at temperatures lower than 80° to 85° Centigrades (176°–185° F.),

I claim:

1. A method for separating the toxic resinous fraction from prepared whole jojoba seeds or jojoba seed press-cake, said resinous fraction comprising toxic p-coumaric acid derivatives, said method comprising extracting said resinous fraction with of an apolar mixture of solvents which mixture is a selective eluter for said p-coumaric acid derivatives.

2. The method of claim 1, in which said resinous fraction is extracted by means of a mixture of acetone and another aliphatic solvent, said mixture comprising up to 70 vol. % acetone.

3. The method of claim 1, in which said resinous fraction is extracted by means of a mixture of acetone and hexane comprising up to 41 vol. % acetone.

4. The method claim 1, in which said resinous fraction is extracted by means of a mixture of methyl ethyl ketone and another aliphatic solvent, said mixture comprising up to 80 vol. % methyl ethyl ketone.

5. The method of claim 1, in which said resinous fraction is extracted by means of a mixture of methyl ethyl ketone and hexane comprising up to 50 vol. % methyl ethyl ketone.

6. The method of claim 1, in which said resinous fraction is extracted from an oil-free jojoba press-cake.

7. The method of claim 1, in which said resinous fraction is extracted in a single step with the residual oil from an oil containing jojoba press-cake.

* * * * *